(No Model.)
J. D. HAZLET & L. L. LORD.
TAPER ATTACHMENT FOR LATHES.
No. 450,016. Patented Apr. 7, 1891.
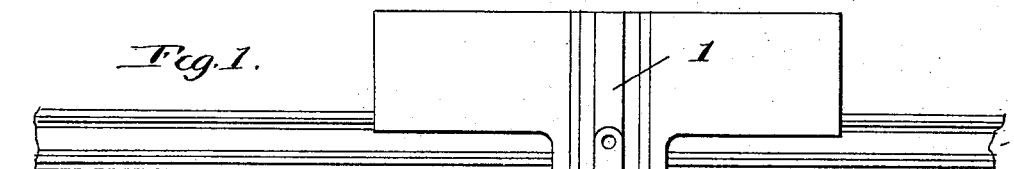
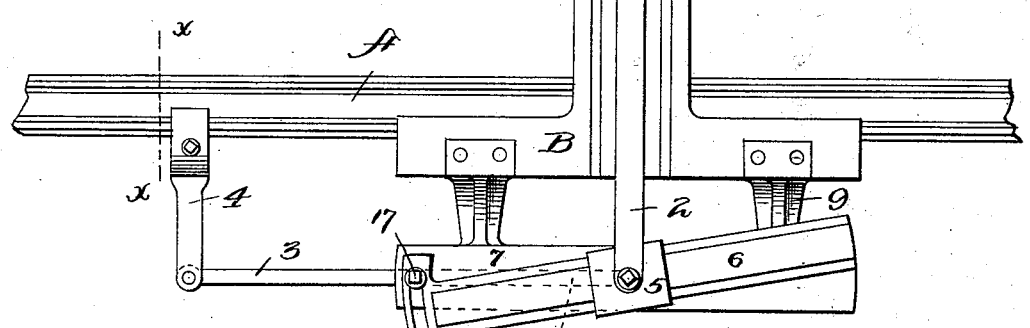
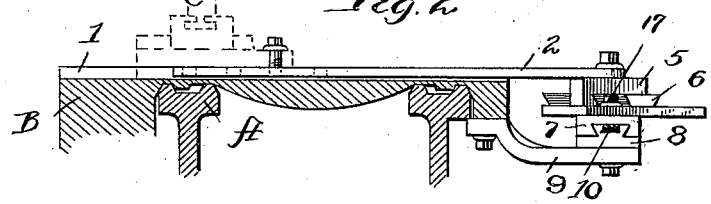
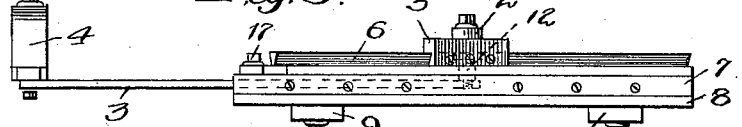
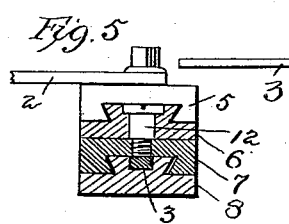
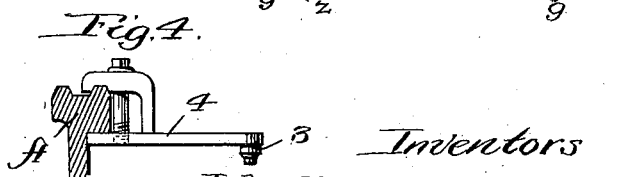
Witnesses
W. S. Keene
F. L. Middleton
Inventors
John D. Hazlet and
Lewis L. Lord,
by Ellis Spear
Atty.

UNITED STATES PATENT OFFICE.

JOHN D. HAZLET AND LEWIS L. LORD, OF MEADVILLE, PENNSYLVANIA.

TAPER ATTACHMENT FOR LATHES.

SPECIFICATION forming part of Letters Patent No. 450,016, dated April 7, 1891.

Application filed September 30, 1890. Serial No. 366,676. (No model.)

*To all whom it may concern:*

Be it known that we, JOHN D. HAZLET and LEWIS L. LORD, citizens of the United States of America, residing at Meadville, in the county of Crawford and State of Pennsylvania, have invented certain new and useful Improvements in Taper Attachments for Lathes, of which the following is a specification.

Our invention is a taper attachment for engine-lathes.

Our lathe attachment includes a slip-block connected to the tool-holder and guides to make said holder move laterally of the bed to form the taper; and the novelty in the invention, broadly speaking, lies in the means for supporting the slip-block and guide; the said support being carried by the moving carriage and always bearing the same relation to the slip-block and the point of strain.

In the drawings, Figure 1 is a plan view. Fig. 2 is a transverse section with the tool-holder in dotted lines. Fig. 3 is a side view of the slip-block, its guide, and the support therefor. Fig. 3ª is a similar view with the parts in another position. Fig. 4 is a section on line *x x* of Fig. 1. Fig. 5 is a vertical transverse section on line *z z* of Fig. 3ª.

In the drawings, the bed A, the carriage B, and the tool-holder C are of ordinary construction, the carriage having transverse guideways 1, along which the tool-holder moves in forming the taper. The tool-holder is operated by a bar 2, connected with a slip-block 5, and the lateral position of the slip-block in relation to the bed and the work is determined by an adjustable guide having a dovetailed rib 6, the inclined position of which corresponds to the incline of the taper to be formed, and as the carriage moves the slip-block travels along the inclined guide and through the connection 2 moves the tool-block laterally. The guide 6 is held against longitudinal movement upon a plate 7 by a screw 12, which acts as a pivot, and a screw 17 passing through a curved slot 16 in the guide by which the adjustment is effected. The plate 7 has a dovetailed channel in its under side, and into this fits a dovetail rib on the bar 8, which supports all the parts just described—that is, the plate 7, the guide 6, and the slip-block. This support 8 is carried by brackets 9 at each end secured to the moving carriage and equally distant from the block 5, with which the support and brackets move and always bear the same relation. The plate 7 and the guide 6 are held against longitudinal movement by a bar 3, secured at one end to a bracket 4, fastened to the bed, and at the other end connected to the screw 12, which connects the guide and plate 7. A channel 10 is formed in the dovetail rib of the support 8 to receive the bar 3.

When the carriage moves, the guide-plate and the plate 7 remain stationary, while the slip-block and support 8 move together with the brackets 9, the bar 2, and the tool-holder. As the support 8 moves in the dovetail channel of the plate 7, it acts as a bearing for the plate 7, and retains said plate in proper position in alignment with the bed to secure perfect action of the parts. The bar 2 is adjustably connected with the tool-holder to vary the position of the same for different work.

By reason of supporting the plate 8, which sustains the plate 7 and the guide 6 on the carriage, no adjustment of these parts is necessary to suit different lengths of material operated upon, as the brackets and plate move with the carriage and thus bear at all times the same relation to the point of work. In machines now in use the supporting-brackets are connected to the bed and they must be adjusted opposite the point of work, and when the length of the material to be turned is changed the adjustment of the brackets is required on the bed.

We claim as our invention—

1. In combination, the bed, the carriage, the laterally-movable tool-holder, the inclined guide 6, having a slipping connection therewith, the plate 7 for the inclined guide, the support 8, movably engaging the plate 7 and connected with the carriage, and means for holding the plate 7 with the guide against longitudinal movement, substantially as described.

2. In combination, the bed, the carriage, the laterally-movable tool-holder, the guide 6, the slip-block, and the connection 2, the plate 7, the support 8, connected with the carriage, and the bar 3, connecting the plate 7 with the bed, substantially as described.

3. In combination with the bed, carriage, and tool-holder, the inclined guide 6, the slip-block, and the bar 2, the plate 7, the screw 12 for pivotally connecting the guide and the plate, the support 8, connected with the carriage, and the bar 3, connected with the bed and connected with the plate 7 by means of the screw 12, substantially as described.

In testimony whereof we affix our signatures in presence of two witnesses.

JOHN D. HAZLET.
LEWIS L. LORD.

Witnesses:
CHAS. H. YOUTS,
OTTO A. STOLZ.